US00RE44604E

(19) United States
(12) Reissued Patent
Kerr et al.

(10) Patent Number: US RE44,604 E
(45) Date of Reissued Patent: Nov. 19, 2013

(54) SYSTEM FOR AND METHOD OF SYNCHRONOUS ACQUISITION OF PULSED SOURCE LIGHT IN PERFORMANCE OF MONITORING AIRCRAFT FLIGHT OPERATION

(75) Inventors: J. Richard Kerr, West Linn, OR (US); Gregory A. Zuro, Portland, OR (US); Michael E. Fossey, Portland, OR (US)

(73) Assignee: Max-Viz, Inc., Portland, OR (US)

(21) Appl. No.: 13/453,862

(22) Filed: Apr. 23, 2012

Related U.S. Patent Documents

Reissue of:
(64) Patent No.: 7,705,879
Issued: Apr. 27, 2010
Appl. No.: 12/279,158
PCT Filed: Feb. 13, 2007
PCT No.: PCT/US2007/003893
§ 371 (c)(1),
(2), (4) Date: Aug. 12, 2008
PCT Pub. No.: WO2007/095282
PCT Pub. Date: Aug. 23, 2007

U.S. Applications:
(60) Provisional application No. 60/772,956, filed on Feb. 13, 2006.

(51) Int. Cl.
*H04N 7/18* (2006.01)
*H04N 7/00* (2006.01)

(52) U.S. Cl.
USPC ..... 348/117; 348/119; 348/116; 348/113; 348/123; 348/471; 250/330; 340/907

(58) Field of Classification Search
USPC ..... 348/117, 116, 119, 123, 122, 113, 114, 348/135, 144, 471, 472; 250/300, 330; 701/300; 725/76, 75; 340/907, 870.18, 340/948, 972
See application file for complete search history.

(56) References Cited

U.S. PATENT DOCUMENTS

| | | | |
|---|---|---|---|
| 5,303,031 | A | 4/1994 | Khoury et al. |
| 5,654,890 | A | 8/1997 | Nicosia et al. |
| 5,684,588 | A | 11/1997 | Khoury et al. |
| 5,859,713 | A | 1/1999 | Khoury et al. |
| 6,119,055 | A | 9/2000 | Richman |
| 6,157,876 | A | 12/2000 | Tarleton et al. |

(Continued)

FOREIGN PATENT DOCUMENTS

| | | | |
|---|---|---|---|
| DE | 36 31 321 | A1 | 3/1988 |
| GB | 2 224 613 | A | 5/1990 |

OTHER PUBLICATIONS

May 2, 2011 Supplementary European Search Report for European Patent Application No. 07750714.3.

*Primary Examiner* — Jefferey Harold
*Assistant Examiner* — Jean W Desir
(74) *Attorney, Agent, or Firm* — Stoel Rives LLP

(57) ABSTRACT

A system for and a method of synchronous acquisition of pulsed source light performs monitoring of aircraft flight operation. Diode sources of illumination (18, 108, 208) are pulsed (16, 106, 206) at one-half the video frame rate of an imaging camera (36, 136, 236). Alternate frames view the world-scene with lights of interest pulsed on, and then off, respectively. Video differencing (34, 134, 234) eliminates the background scene, as well as all lights not of interest. Suitable threshholding over a resulting array of camera pixel-differences acquires the desired lights and represents them as point symbology on a display (40, 140, 240). In an enhanced vision landing system embodiment, the desired lights (symbols) overlay or are fused on a thermal image of the scene; alternatively, the symbols overlay a visible scene (TV) image.

27 Claims, 4 Drawing Sheets

(56) References Cited

U.S. PATENT DOCUMENTS

| | | | | |
|---|---|---|---|---|
| 6,232,602 | B1 | 5/2001 | Kerr | |
| 6,264,135 | B1 | 7/2001 | Dacosta | |
| 6,373,055 | B1 | 4/2002 | Kerr | |
| 6,577,339 | B1 | 6/2003 | Thompson et al. | |
| 6,806,469 | B2 | 10/2004 | Kerr | |
| 7,045,783 | B2 | 5/2006 | Matveev | |
| 7,225,063 | B2 * | 5/2007 | Tart et al. | 701/4 |

* cited by examiner

100

SYSTEM FOR AND METHOD OF SYNCHRONOUS ACQUISITION OF PULSED SOURCE LIGHT IN PERFORMANCE OF MONITORING AIRCRAFT FLIGHT OPERATION

Matter enclosed in heavy brackets [ ] appears in the original patent but forms no part of this reissue specification; matter printed in italics indicates the additions made by reissue.

RELATED APPLICATION

This application claims benefit of U.S. Provisional Patent Application No. 60/772,956, filed Feb. 13, 2006.

COPYRIGHT NOTICE

© 2007 Max-Viz, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

TECHNICAL FIELD

This disclosure relates to monitoring of aircraft flight operations and, in particular, to accomplishing early acquisition of light emitted by a target source located at a distance from an imaging camera to perform monitoring of aircraft flight operations.

BACKGROUND INFORMATION

In the U.S. as well as other parts of the world, light emitting diodes (LEDs) are being used as replacements for conventional airport lights, which include approach, runway, and taxiway lights. The reasons are that colored LEDs and bright blue LEDs with white phosphor ("white LEDs") exhibit long-lifetime, low maintenance operation and power savings. These replacement LEDs have no infrared signature.

Conventional lights tend to exhibit peak output at short-wave infrared (SWIR) wavelengths (ranging from visible to 2 microns or more) and are, therefore, better SWIR light emitters than they are visible light emitters. The output of conventional lights at long-wave infrared (LWIR) wavelengths (8-14 microns) is low because the glass lenses do not transmit LWIR energy from inside the bulb and the outside shell is not particularly hot relative to the background temperature. As a consequence, infrared EVS looks for the SWIR output. EVS instrument Model Nos. EVS 2000 and EVS 2500 manufactured by Max-Viz, Inc., the assignee of this patent application, are each implemented with a dedicated, separate SWIR camera that is processed for the lights, and the resulting processed image information is in turn overlaid or fused with LWIR "thermal background" imagery. The "All Weather Window" EVS Systems manufactured by Kollsman, Inc. and SureSight EVS Systems manufactured by CMC Electronics are each implemented with a combined SWIR and medium wave (3-5 microns) infrared (MWIR) camera configured in a single, cryocooled focal plane array (FPA).

Because the LED replacement lights have no infrared signature, detection of them by an EVS system would require use of a separate, visible (television) camera and fusion with the IR thermal imagery. U.S. Pat. Nos. 6,806,469, 6,373,055, and 6,232,602 relate to the use of such image-of-lights fusion. The Federal Aviation Administration (FAA) proposes the use of pulse width (duty cycle) modulation to control average intensity of LED (especially bright, white LED) replacement lights. Significant advantages would redound from the use of a visible camera if it could be operationally implemented with such lights. Such concepts may need to apply to co-located visible and SWIR LEDs. The SWIR LEDs would be of benefit for certain infrared EVS systems, for the reasons explained above. Moreover, there are performance benefits stemming from operation at SWIR rather than visible wavelengths, such as availability of extremely sensitive cameras, certain limited fog-penetration advantages over visible wavelengths, and reduced solar background clutter.

SUMMARY OF THE DISCLOSURE

One problem of interest is use of Enhanced Vision Systems (EVS) for early acquisition of runway/approach lighting under the challenging conditions of extinction by fog. These conditions are exacerbated in daytime by competition from solar-illuminated fog background. In either case, an objective of this application is to significantly exceed the performance of an aircraft pilot's eyes by providing instrumentation in which the lights appear on a display (and in other computer processing operations for runway acquisition/identification, such as, for example, pattern recognition of runway lights and rendering an image of them) well before the pilot can see the lights "out the window."

A related situation is the acquisition of pulsed beacon-equipped aircraft by ground-based cameras synchronized to the pulsed beacons. This application arises in the acquisition and identification of unmanned aerial vehicle (UAV) aircraft as they return to their controllers.

Another problem of interest is use of source and sensor technology that provides see or sense-and-avoid capability for piloted and UAV aircraft in the presence of daytime sky and earth background. An objective of this application is to enable one aircraft using pulsed beacons to see in flight another aircraft equipped with synchronized cameras. This accomplishes aircraft collision avoidance and applies most importantly to UAVs in sensing other aircraft well in advance to overcome the poor maneuverability of UAVs.

The solutions to these problems entail using gated visible or near-infrared video equipment in a synchronous detection mode with compatible, pulsed light emissions, which are sometimes referred to as pulsed beacons. Preferred embodiments implement "opening" the camera synchronously with modulated diode illumination sources, such as approach/landing visible LED pulses proposed by the FAA, or pulsed infrared laser diode emissions for collision avoidance. This is accomplished by operating the camera frame rate at twice the LED or laser diode pulse rate so that alternating frames see background scene with lights and background scene without lights. Then, using a real time video processor, each alternate frame is subtracted so that the background scene is canceled out. The advantages stemming from this approach are that at night, irrelevant lights are canceled, and in the daytime, background solar illumination is canceled.

Video frame differencing results, therefore, in elimination of the background scene, as well as all lights that are not of interest. With a suitable thresholding operation over the resulting pattern of pixel-differences of the camera detector array, the desired lights are acquired and represented as point symbology on a display. In an enhanced vision landing system embodiment, the desired lights (symbols) overlay or are "fused" on a thermal image of the scene; alternatively, the symbols overlay a visible-scene (TV) image.

In daytime scenarios with high sky and earth background levels, the frame integration time is automatically shortened to prevent pixel-well saturation. After frame subtraction, the signal photoelectrons compete only with the background shot noise, which is given by the square root of the number of background photoelectrons in each pixel well. As a consequence, the desired lights can be acquired when they are orders of magnitude below the background. At night, the frame integration time is increased and the acquisition mechanism is limited only by basic camera readout and dark-current noise.

In addition to synchronous detection for acquisition of either a runway or an aircraft, the pulsed light emissions by suitable submodulation technique can carry information representing, for example, a runway or an aircraft identifier. Suitable submodulation techniques are, for example, pulse position or pulse code modulation.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
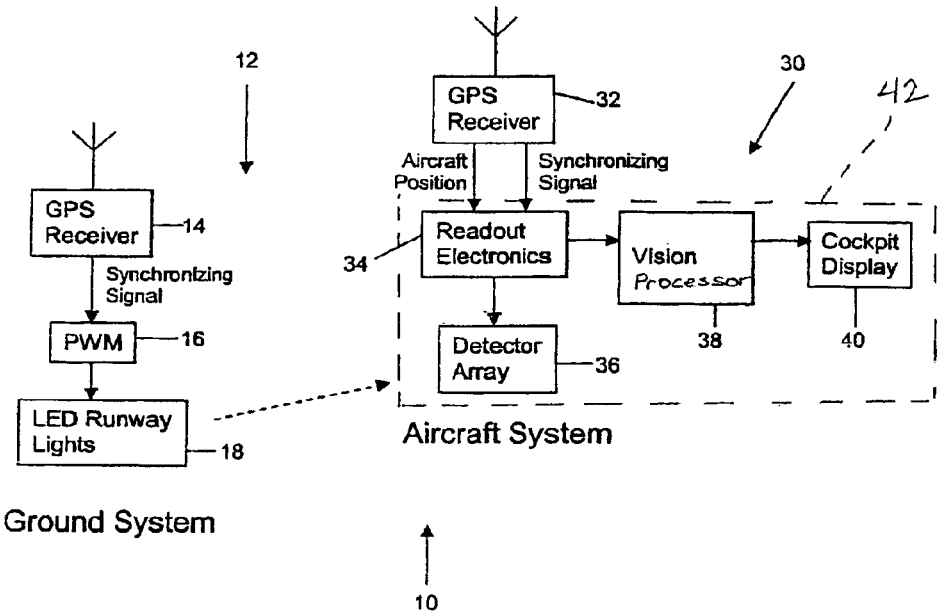
FIG. 1 is a block diagram of an embodiment of an imaging system that is implemented to process modulated LED pulses to form a scene with ground system lights in the absence of background illumination.

FIG. 1 shows an embodiment of an imaging system 10, in which an airborne aircraft system extracts position information by detecting runway lights. In this air-to-ground application, a ground system 12 includes a GPS receiver 14 that provides a synchronous timing signal for a Pulse Width Modulation (PWM) circuit 16 that is used to power and adjust intensity of LED runway lights 18. PWM circuit 16 can be equipped to submodulate pulsed LED runway lights 18 to superimpose on them low-bit-data-rate data providing airport and runway identification information for landing aircraft. LED runway lights 18 are made up of arrays of high intensity LEDs, typically white LEDs for the runway lights and colored LEDs for taxiway lighting.

An aircraft system 30 also includes a GPS receiver 32. In this case, GPS receiver 32 provides a synchronous timing signal and aircraft position. The timing signal is used to control readout electronics 34 to capture the video signal synchronously with the operation of pulse width modulated LED lights 18 of ground system 12. The position information, combined with knowledge of the runway position, is used to correct for small time-of-flight differences between PWM timing and readout electronics timing.

Readout electronics 34, which reads image information acquired by a detector array of an imaging camera 36, is designed to capture a video frame (or multiple video frames) during a time interval when LED runway lights 18 are known to be illuminated, capture a video frame (or multiple video frames) during a time interval when LED runway lights 18 are known to be not illuminated, and then subtract the two frames to produce an image that includes only an image of LED runway lights 18. In this image, background clutter, such as street lights, automobile lights, and detector noise, has been greatly reduced or eliminated.

This image is combined with other sensor information in a vision processor 38 and provided on a cockpit display 40 for viewing by a pilot. The other sensor information includes thermal images, millimeter wave radar images, or both. Cockpit display 40 is either a head-up or a head-down display. The system components enclosed in the dashed line box constitute an Enhanced Vision System (EVS) 42.

To achieve the signal to noise advantage inherent in synchronous detection of the LED light signals, the equipment is configured to synchronize camera operation with pulse width modulation (PWM) timing of the LED lights. In the runway light acquisition application, a first preferred approach is to operate the PWM modulation of runway lights 18 and imaging camera 36 synchronously with the synchronous timing signal derived from global positioning system (GPS) receiver 32. Receivers that generate a 1 PPS signal together with derived higher frequency clocks from GPS signals are readily available from several sources. Using these signals, it is straightforward to develop in the range of 50 Hz to 1,000 Hz phase synchronous signals that are useful for the purposes of synchronization. A second preferred approach is to use a separate optical receiver with a fairly large aperture and a single photodiode to detect the LED light and send a timing signal to imaging camera 36. The advantage of this approach is that it imposes fewer constraints on the design of the LED lighting system. A third preferred approach is to "lock on" to the light images detected by imaging camera 36 and adjust the detection timing to optimize the signal to noise ratio. From a system standpoint, this is the lowest cost approach, but it may not be so robust as the two approaches described above.

To avoid the appearance of "pulsing" as the pilot observes runway lights 18, the LEDs are modulated at 50 Hz or higher.

If SWIR is used, there is available the option of fusing dual visible/SWIR cameras to see both types of LEDs. The wavelength-tradeoffs are summarized as follows. At SWIR (e.g., approximately 1.5 microns), the solar daytime fog radiance is advantageously diminished roughly tenfold from that of visible wavelengths. Compared to runway light sources operating at visible wavelengths, powerful SWIR runway light sources (which may have to be diode lasers rather than LEDs) are more expensive. SWIR cameras are also expensive. Lasers have smaller spectral width (e.g., 15 nm) compared to that of LEDs, so lasers permit more spectral filtering of the solar background. Runway light emission at 1.5 microns undergoes somewhat lower extinction in haze or fine-particulate obscurants, as compared to that of visible wavelengths. There is not much difference in water-fog, but there is about a 5% extinction advantage over visible wavelengths. This is a significant increase in light level because it is an exponential function of the distance. At 1.5 microns, the FAA is burdened with choosing the precise LED or laser wavelength carefully to avoid atmospheric (molecular) absorption spectral structure. Fast frame-rate cameras are more readily available at visible wavelengths.

Although the base line technique of monitoring aircraft flight operation entails use of on-off light emissions for acquisition with video frame differencing, coding options, other than PWM described above, include pulse code modulation, pulse position modulation, pseudo-random coding, and error-correcting codes. Implementation of optical fiber communication system technology may afford other advantageous coding techniques.

In the specific case of interest, i.e., fog, the limitations on acquiring the LEDs include camera (focal plane readout) noise and daytime background-scene shot noise.

Visible light sensitive image cameras, such as CCD or CMOS sensor cameras, permit operation at faster frame rates than those of conventional television cameras (i.e., 30 Hz-60 Hz). Moreover, recent advances in readout technology also permit increased frame rates in SWIR cameras. There is, therefore, an option to pulse the lights significantly faster than 50 Hz and add the signals from N number of sequential frame-subtracted pairs. This further increases the signal to noise ratio (SNR) by $\sqrt{N}$. At the completion of N pairs, a thresholding or other detection processing operation extracts the desired (LED-imaged) pixels. Although it will not be geometrically resolved by the camera pixels, a given LED may in reality illuminate several pixels, owing to the blurring or loss of modulation transfer function (MTF) caused by multiple scattering in fog.

A preferred approach is to use a camera that integrates the optical signal for all pixels at the same time. This capability is described by different words by different manufacturers. Some IR camera manufacturers describe cameras with this characteristic as having "snapshot mode." Other visible CCD camera manufacturers describe this as "full frame capture." The common characteristic is that all pixels accumulate electrons during the same time period and then clock them out in sequence as a video signal after the capture period.

More commonly, cameras operate in "rolling mode." In this mode, each line in the array starts accumulating electrons right after the line has been read out. The accumulation stops when it is time to read out that line again. Use of this type of camera entails operation of the camera at a frame rate that is much higher than the LED PWM frequency. For each PWM cycle, many frames (in the range of 10 to 20) are captured. The frames are then processed line by line in vision processor 38, combining the lines that occur when the LEDs are known to be on to create an "ON" image, and combining the lines that occur when the LEDs are known to be off to create an "OFF" image. The difference between these two images is used to create the best image, one for each PWM cycle. In this mode the camera operates in the range of 500 to 2,000 frames per second.

Once this scheme has acquired the desired lights, the data constitute a per-frame set of points (pixels), each of which represents an LED. This in turn is handed off to vision processor 38, which relates the lights to a runway database and subsequently performs integrity monitoring and EVS-based navigation functions, as well as generates a symbolic runway display for the pilot. It also constitutes a "verification of synthetic vision display integrity" (fusion of database imagery with real-time imagery).

Higher frame rates can require reduced resolution, i.e., read out a smaller number of pixels. The use of only part of the focal plane array either limits the field of view (FOV) (which is bad for runway acquisition) or implies less resolution (larger angular instantaneous FOV (IFOV)) at the same FOV. The latter is undesirable in that it may degrade the performance of subsequent database-correlation processing, and in the daytime it implies higher background noise photon count for each pixel. Therefore, if use of such partial FPA is required, techniques of dynamic windowing may be indicated. Although reduced resolution is required, particularly in SWIR cameras, rates of hundreds of Hz to a couple of KHz are possible. The above model assumes that the image of a given LED will stay on the same pixel during the N pulses, which assumption in turn has two aspects. The first is aircraft transient attitude changes. For transport aircraft, this is probably not a significant problem, particularly in light turbulence, which is the case in fog. The second is the changing range and distribution of the perspective image of lights during landing approach. This is much less of a factor at the longer ranges that apply to the early approach phase, where acquisition in fog is a challenge.

The above synchronization scheme enables acquisition of LEDs at several times the "runway visible range" (RVR), i.e., well beyond the pilot's visual ability. For a simple illustration, to acquire at three RVRs, an LED-camera system operates with a (fog) transmission factor of $(0.05)^3 \approx 1.25\ E(-4)$. In a daytime solar fog scenario, the interfering solar background is a featureless gray.

If both visible and SWIR LEDs are used (co-located), there is an option of applying both visible and SWIR cameras and fusing the results before final acquisition detection for the field of lights. As explained above, the former is much less expensive, but the latter is much higher in performance.

The ultimate determination of whether a LED-image is present in a given pixel may be far more sophisticated than simple threshold detection and may include temporal domain, spatial domain, or spatio-temporal domain processing. In the temporal domain, the entire range of communications-theoretical tools for pulse-detection is applicable. Statistical means may be used, including for example the estimation of background and/or camera noise levels during the "LED-off" periods. In the spatial domain, the decision may also use local (maxima) and/or global spatial determinations across the FPA. In the spatio-temporal domain, there is use of motion tracking/prediction.

Other applications extending the runway lights application include manual placement of a set of pulsed LED or laser diode beacons to define a landing zone in a primitive or tactical area of a special military force operation and deployment of individual personal pulsed beacons by downed personnel providing location information for purpose of rescue. Such applications would be more amenable to use of rotary wing aircraft.

Figure 2:
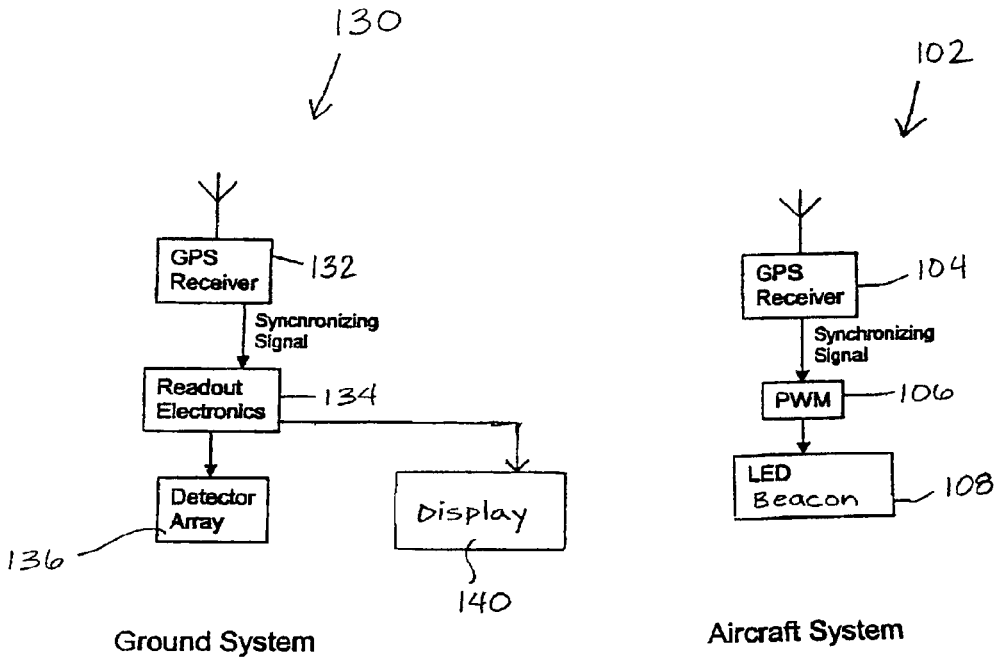
FIG. 2 is a block diagram of an embodiment of an imaging system in which a ground system tracks an aircraft equipped with a pulsed light beacon.

FIG. 2 shows an embodiment of an imaging system 100 in which a ground system tracks an aircraft equipped with a pulsed light beacon. In this ground-to-air application, an aircraft system 102 includes a GPS receiver 104 that provides a synchronous timing signal for a PWM circuit 106 used to modulate the intensity of an LED beacon 108. PWM circuit 106 can be equipped to submodulate pulsed LED beacon 108 to superimpose on it low-bit-data-rate data providing aircraft or flight identification information that the air traffic control system would automatically acquire upon entry of the aircraft to final approach. LED beacon 108 is made up of arrays of high intensity LEDs, typically white LEDs.

A ground system 130 also includes a GPS receiver 132. In this case, GPS receiver 132 provides a synchronous timing signal, which is used to control readout electronics 134 to capture the video signal synchronously with the operation of pulse width modulated LED beacon 108 of aircraft system 102. Knowledge provided by GPS receivers 104 and 134 of the relative positions between the beaconed aircraft and ground system 130 is used to correct for small time-of-flight differences between PWM timing and readout electronics timing.

Readout electronics 134, which reads image information acquired by a detector array of an imaging camera 136, is designed to capture a video frame (or multiple video frames) during a time interval when LED beacon 108 is known to be illuminated, capture a video frame (or multiple video frames) during a time interval when LED beacon 108 is known to be not illuminated, and then subtract the two frames to produce an image that includes only an image of LED beacon 108. In this image, background clutter, such as solar illumination and detector noise, has been greatly reduced or eliminated. This image is provided on a display 140 for viewing by a ground-based observer. After acquisition of the beaconed aircraft, synchronous detection in imaging camera 136 may be performed to track the aircraft. For beaconed UAV aircraft, imaging camera 136 may be used to track a UAV as it returns to its controller.

Figure 3:
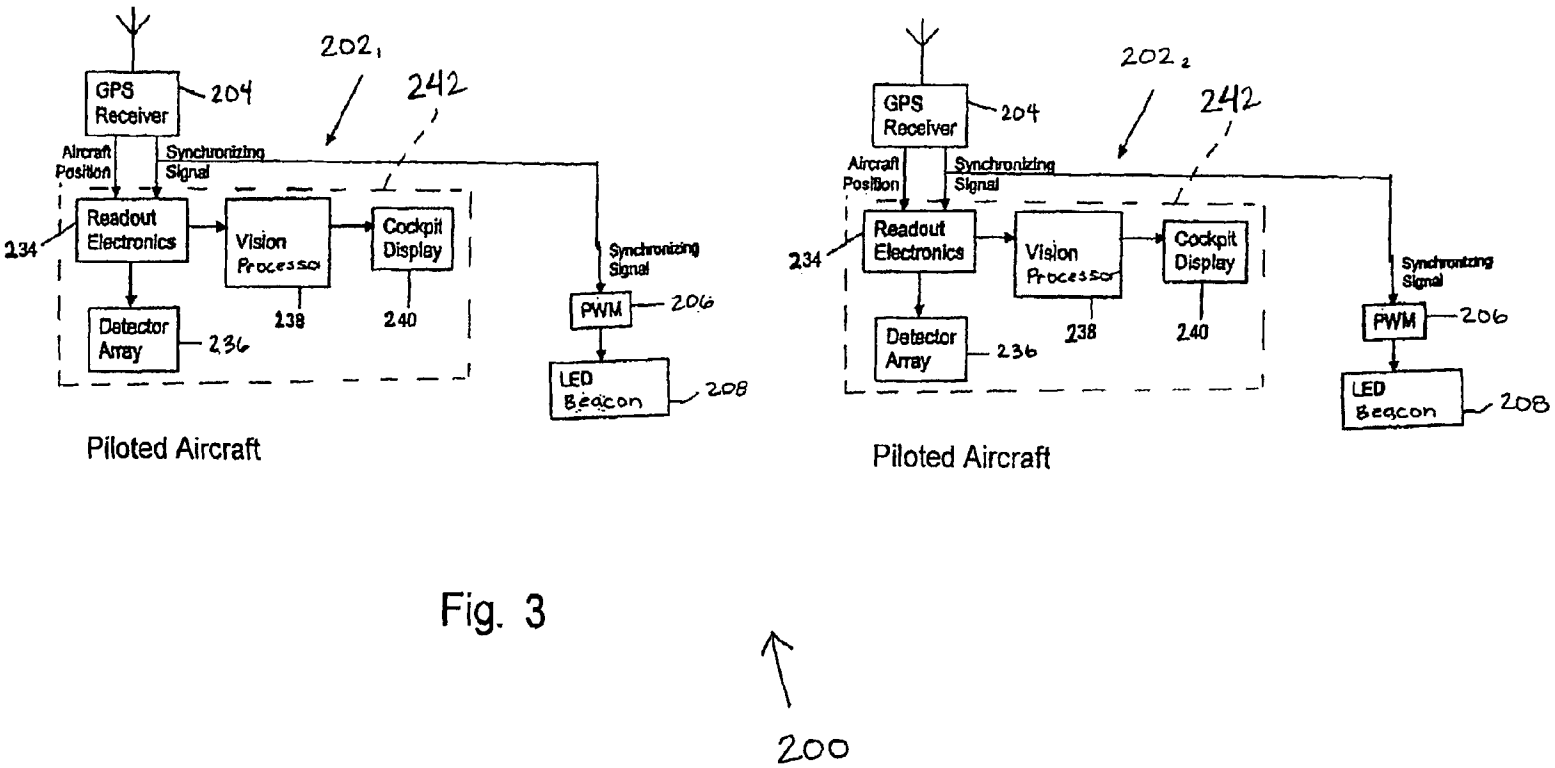
FIG. 3 shows an embodiment of an imaging system in which an aircraft equipped with a pulsed light source beacon and a gated image camera tracks similarly equipped aircraft for collision avoidance.

FIG. 3 shows an embodiment of an imaging system 200 in which an aircraft equipped with a pulsed light source beacon and a gated image camera tracks similarly equipped aircraft for collision avoidance. In this air-to-air application, each of two piloted aircraft systems 202, and $\mathbf{202}_2$ provided on different aircraft includes a GPS receiver 204 that provides a synchronous timing signal for a PWM circuit 206 used to modulate the intensity of a laser diode source beacon 208. PWM circuit 206 can be equipped to submodulate pulsed laser diode source beacon 208 to superimpose on it low-bit-data-rate data providing aircraft identification information to the target aircraft system. For the present air-to-air application, the SWIR wavelength of 1,550 nm is particularly advantageous in terms of laser diode source availability, performance of InGaAs-based imaging cameras, reduced ambient background levels, and eye safety.

GPS receiver 204 also provides the synchronous timing signal to control readout electronics 234 to capture the video signal synchronously with the operation of pulse width modulated laser diode source beacon 208 of the target aircraft system. Knowledge provided by the two GPS receivers 204 of the relative positions between the two beaconed aircraft is used to correct for small time-of-flight differences between PWM timing and readout electronics timing.

Readout electronics 234, which reads image information acquired by a detector array of an imaging camera 236 of the acquiring aircraft system, is designed to capture a video frame (or multiple video frames) during a time interval when laser diode source beacon 208 of the target aircraft system is known to be illuminated, capture a video frame (or multiple video frames) during a time interval when laser diode source beacon 208 of the target aircraft system is known to be not illuminated, and then subtract the two frames to produce an image that includes only an image of laser diode source beacon 208. In this image, background clutter, such as solar illumination and detector noise, has been greatly reduced or eliminated. This image is combined with other sensor information in a vision processor 238 and provided on a cockpit display 240 to present to the pilot background scene information in addition to the beacon lights. The system components enclosed in the dashed line box constitute an EVS 242. After acquisition of the beaconed target aircraft, synchronous detection in imaging camera 236 of the acquiring aircraft may be performed to track the target aircraft.

Figure 4:
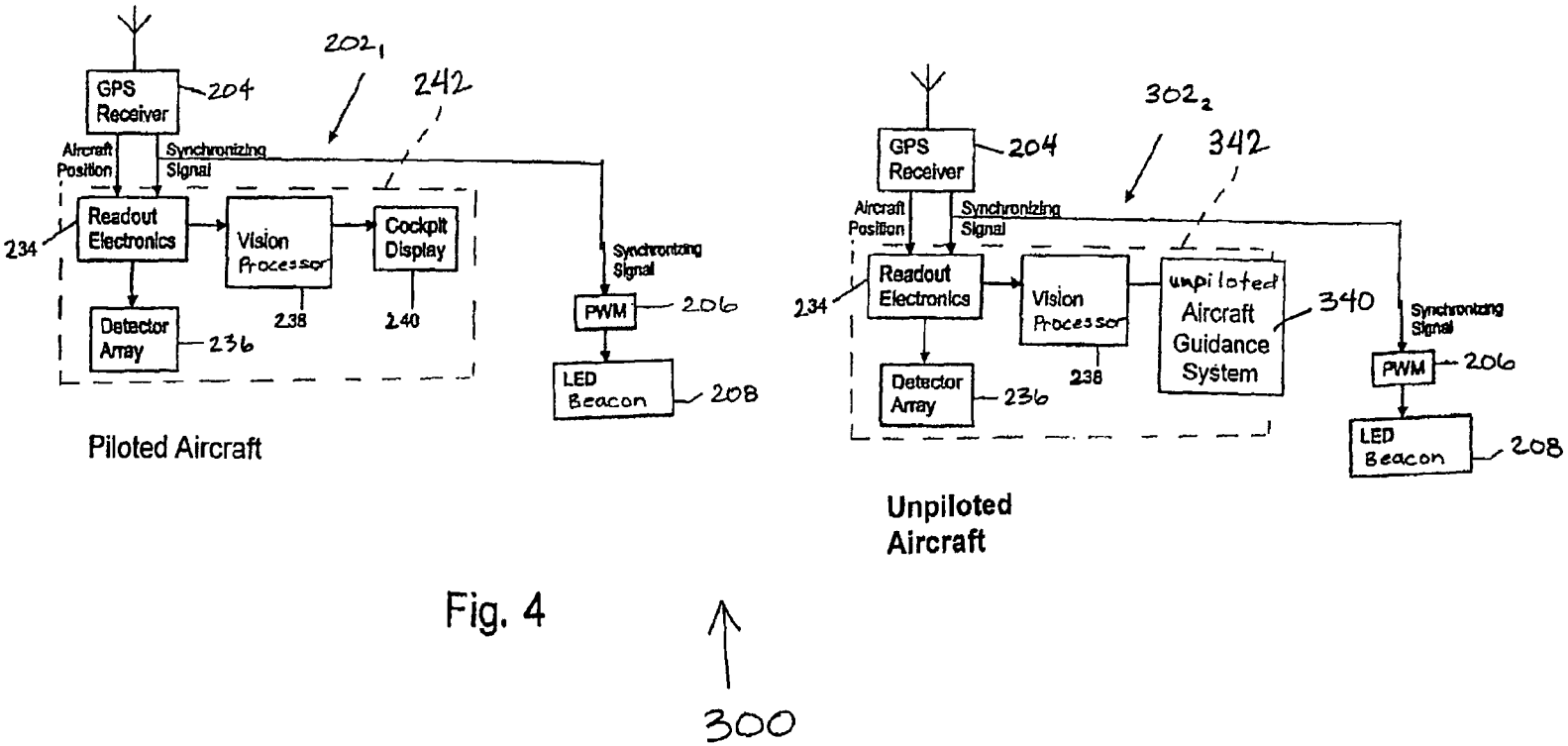
FIG. 4 shows a variation of the embodiment of FIG. 3, in which one of the aircraft is an unpiloted vehicle equipped with a pulsed light source beacon, which allows the unpiloted aircraft to be monitored and avoided by piloted aircraft, and a vision processor and an unpiloted aircraft guidance system, which enables autonomous refueling.

FIG. 4 shows an imaging system 300 that differs from imaging system 200 shown in FIG. 3 in that the former includes a piloted aircraft and an unpiloted aircraft. In this air-to-air application, the piloted aircraft of imaging systems 200 and 300 are equipped with the same aircraft system $\mathbf{202}_1$ as described above, but the unpiloted aircraft is equipped with an aircraft system $\mathbf{302}_2$ that differs from aircraft system $\mathbf{202}_2$. The aircraft are equipped with pulsed light source beacons and gated image cameras for collision avoidance. The difference is that, in aircraft system $\mathbf{302}_2$, the output of vision processor 238 is delivered to an unpiloted aircraft guidance system 340. The system components enclosed in the dashed line box constitute an EVS 342. Aircraft system $\mathbf{302}_2$ equipped with vision processor 238 and unpiloted aircraft guidance system 340 enables autonomous refueling.

A representative imaging camera sensor field of view on the acquiring aircraft is 180 degrees azimuth by 96 degrees vertical. The field of view is based on heuristic performance calculations on which a pixel resolution of 1.6 milliradians is assumed. This sensor can be achieved with six small, uncooled InGaAs cameras having individual resolutions of 640×512 pixels, which are commercially available. The cameras are arrayed in a mosaic of 3 cameras across and 2 cameras down.

For air-to-air acquisition, a representative source beacon radiates over a solid angular range of 360 degrees azimuth by 150 degrees elevation. A target aircraft equipped with a properly designed system implemented with a very simple, compact pulsed laser diode unit can readily be acquired at 5 miles in daytime background conditions and moderately clear air. Operation with significant . atmospheric extinction would entail provision of a compound-diode emitter assembly on the target aircraft.

Synchronous timing of airborne source beacons 208 and gated imaging cameras 236 is derived from GPS signals. Since typical imaging camera integration times are on the order of milliseconds or greater, the finite speed of light does not create significant issues with respect to relative source-camera synchronization over 5—mile ranges. At extreme ranges beyond 5 miles, knowledge of relative positions may be used to correct for small time-of-flight differences between PWM timing and readout electronics timing.

The equipment specifications described above emphasize optimum implementation for automatic air-to-air sensing of an arbitrary aircraft, e.g., from a UAV. However, there exists the option of implementing the above scheme at visible wavelengths using LEDs as source illuminators and suitable television cameras. Although it provides automated acquisition beyond the ability of the human eye, particularly in the presence of background, the gated LED-camera combination alternative also provides direct pilot visibility of the target aircraft beacons on a display 240 of information delivered by EVS 238.

The applications and implementations presented above apply equally, irrespective of whether the diode emitter is an LED or a laser diode. LEDs are typically used in applications requiring one or both of maximum beacon and camera economy and direct eye visibility. SWIR and laser diodes are typically used for highest operational performance.

It will be obvious to those having skill in the art that many changes may be made to the details of the above-described embodiments without departing from the underlying principles of the invention. The scope of the present invention should, therefore, be determined only by the following claims.

The invention claimed is:

1. A method of using an aircraft-borne system to accomplish early acquisition of landing zone illumination obscured from pilot view because of visible light extinguishing atmospheric conditions, [comprising:]

[modulating] the landing zone illumination *being modulated* at a modulation rate[;], *comprising:* using an imaging camera to acquire a sequence of image frames of a scene in which the *modulated* landing zone illumination is contained, the sequence of image frames being acquired at a rate that is synchronized with and is a known multiple of the modulation rate;

setting the known multiple to a value that causes the sequence of image frames to include first and second sets of images representing, respectively, background scene information including the *modulated* landing zone illumination and background scene information not including the *modulated* landing zone illumination; and processing the first and second sets of images to remove the background scene information from temporally corresponding images of the first and second sets and thereby provide processed image information from which acquisition of the *modulated* landing zone illumination can be performed.

2. The method of claim 1, in which the image frames are acquired at a rate that is twice the modulation rate.

3. The method of claim 1, in which the [modulating] *modulation* of the landing zone illumination is accomplished by pulse width modulation.

4. The method of claim 1, in which the processing of corresponding images includes subtracting temporally corresponding images of the first and second sets to provide the modified scene.

5. The method of claim 1, in which the landing zone illumination [is of] *propagates from* an LED [type] that emits wavelengths of visible light and the imaging camera is sensitive to visible light.

6. The method of claim 1, in which the landing zone illumination [is of a type] *propagates from a landing zone light source* that emits short-wave infrared (SWIR) light and the imaging camera is sensitive to SWIR light.

7. The method of claim 1, [further comprising:]

[pulsing the] *in which the modulated* landing zone illumination *is pulsed* at a pulsing rate, and *further comprising:* operating the imaging camera at an acquisition rate to acquire the sequence of image frames of a scene, the pulsing and the acquisition rates exceeding the frame rate of a conventional television camera;

performing the processing of the first and second sets of images by forming N number of pairs of temporally corresponding images of the first and second sets; and integrating the N number of pairs at an integration rate that exceeds the frame rate of a conventional television camera to establish a signal-to-noise ratio that increases with an increasing integration rate.

8. The method of claim 1, in which the landing zone illumination includes a field of airport lights.

9. The method of claim 1, in which the *modulated* landing zone illumination includes a pulsed light beacon.

10. The method of claim 9, in which the pulsed light beacon is of a portable type.

11. The method of claim 1, in which a landing zone receives the *modulated* landing zone illumination, and further comprising submodulating the *modulated* landing zone illumination at a submodulation rate providing identification information about the landing zone.

12. The method of claim 11, in which the landing zone identification information identifies an airport.

13. A method of using an aircraft-borne system to accomplish early acquisition of landing zone illumination obscured from pilot view because of visible light extinguishing atmospheric conditions, [comprising:]

[modulating] the landing zone illumination *being modulated* at a modulation rate[, the landing zone illumination] *and* emitting light in first and second wavelength ranges[;], *comprising:* using first and second imaging cameras that are sensitive to light in the respective first and second wavelength ranges to acquire sequences of image frames of a scene in which the *modulated* landing zone illumination is contained, the sequences of image frames being acquired at rates that are synchronized to the modulation rate, and each of the sequences of image frames including first and second sets of images representing, respectively, background scene information including the *modulated* landing zone illumination and background scene information not including the *modulated* landing zone illumination;

processing the first and second sets of images of each sequence to remove the background scene information from temporally corresponding images of the first and second sets and thereby provide processed image information; and fusing the processed image information relating to each of the sequences and performing on the fused processed image information acquisition of the *modulated* landing zone illumination.

14. The method of claim 13, in which the [modulating] *modulation* of the landing zone illumination is accomplished by pulse width modulation.

15. The method of claim 13, in which the first and second wavelength ranges include wavelengths of, respectively, visible light and SWIR light.

16. A method of accomplishing early acquisition of light emitted by a target source located at a distance from an imaging camera to perform monitoring of aircraft flight operation, [comprising:]

[modulating] the target source light emission *being modulated* at a modulation rate[;], *comprising:* using the imaging camera to acquire a sequence of image frames of a scene in which the *modulated* target source light emission is contained, the sequence of image frames being acquired at a rate that is synchronized with and is a known multiple of the modulation rate;

setting the known multiple to a value that causes the sequence of image frames to include first and second sets of images representing[;], respectively, background scene information including the *modulated* target source light emission and background scene information not including the *modulated* target source light emission; and processing the first and second sets of images to remove the background scene information from temporally corresponding images of the first and second sets and thereby provide processed image information from which acquisition of the *modulated* target source light emission can be performed to enable the monitoring of aircraft flight operation.

17. The method of claim 16, in which the modulated target source light emission propagates from a ground system, and in which the imaging camera is included and the first and second sets of images are processed in an aircraft-borne system, thereby enabling the monitoring of aircraft flight operation by the aircraft.

18. The method of claim 16, in which the modulated target source light emission propagates from an aircraft-borne system, and in which the imaging camera is included and the first and second sets of images are processed in a ground system, thereby enabling the ground system to monitor flight operation of the aircraft.

19. The method of claim 16, in which the modulated target source light emission propagates from a first aircraft-borne system, and in which the imaging camera is included and the first and second sets of images are processed in a second aircraft-borne system, thereby enabling monitoring flight operation of the first aircraft by the second aircraft.

20. The method of claim 19, in which one of the first and second aircraft-borne systems is on a piloted aircraft and the other one of the first and second aircraft-borne systems is on an unpiloted aircraft.

21. The method of claim 19, in which the first and second aircraft-borne systems are on different piloted aircraft.

22. The method of claim 16, further comprising submodulating the *modulated* target source light emission at a submodulation rate providing identification information about the target source of light emission.

23. The method of claim 16, in which the image frames are acquired at a rate that is twice the modulation rate.

24. The method of claim 16, in which the processing of corresponding images includes subtracting temporally corresponding images of the first and second sets to provide the modified scene.

25. The method of claim 16, in which the target source light emission propagates from an LED that emits wavelengths of visible light and the imaging camera is sensitive to visible light.

26. The method of claim 16, in which the target source light emission propagates from a target light source that emits short-wave infrared (SWIR) light and the imaging camera is sensitive to SWIR light.

27. The method of claim 16, in which the modulated target source light emission includes a pulsed light beacon of a portable type.

* * * * *

UNITED STATES PATENT AND TRADEMARK OFFICE

CERTIFICATE OF CORRECTION

PATENT NO. : RE44,604 E
APPLICATION NO. : 13/453862
DATED : November 19, 2013
INVENTOR(S) : J. Richard Kerr, Gregory A. Zuro and Michael E. Fossey It is certified that error appears in the above-identified patent and that said Letters Patent is hereby corrected as shown below:

In the Specification

Insert as a new paragraph above the heading RELATED APPLICATION, which appears at column 1, line 13:

--Notice: More than one reissue application has been filed for the reissue of U.S. Patent No. 7,705,879. A continuation reissue patent application is U.S. Patent Application No. 14/083,212, filed November 18, 2013.--

Signed and Sealed this
Fifth Day of May, 2015

Michelle K. Lee

Michelle K. Lee
*Director of the United States Patent and Trademark Office*